WARREN HOLDEN.

Boot and Shoe Stretchers.

No. 4,799. Reissued March 12, 1872.

Witnesses.

A. J. H. Chumway

A. J. Tibbits

"The Stiles & Parker Press Co" Assignees of Warren Holden

Inventor

By their Atty.

Thos. E. Earle

UNITED STATES PATENT OFFICE.

WARREN HOLDEN, OF PHILADELPHIA, PENNSYLVANIA, ASSIGNOR, BY MESNE ASSIGNMENTS, TO THE STILES AND PARKER PRESS COMPANY, OF MIDDLETOWN, CONNECTICUT.

IMPROVEMENT IN BOOT AND SHOE STRETCHERS.

Specification forming part of Letters Patent No. 12,793, dated May 1, 1855; extended seven years; reissue No. 4,799, dated March 12, 1872.

*To all whom it may concern:*

Be it known that WARREN HOLDEN, of Philadelphia, in the county of Philadelphia and State of Pennsylvania, invented a new Device for Stretching Boots and Shoes; and we do hereby declare the following, when taken in connection with the accompanying drawing and the letters of reference marked thereon, to be a full, clear, and exact description of the same, and which said drawing constitutes part of this specification, and represents, in—

Figure 1:
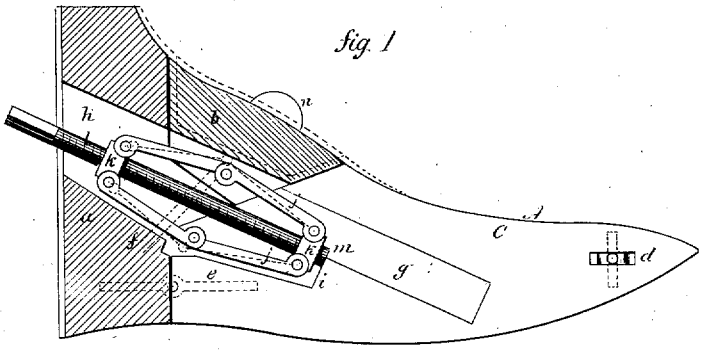
Figure 2:
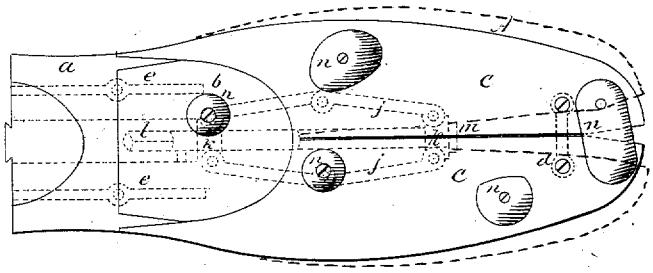
Figure 3:
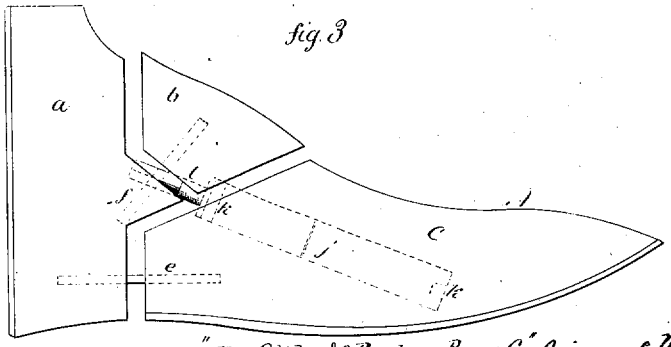

Figure 1, a longitudinal section of the improvement; Fig. 2, a plan or top view; and in Fig. 3, a side view of the same.

This invention relates to a device for stretching a finished boot or shoe at any desired point in order to conform to the foot of the wearer; and it consists in the construction of a last divided into several parts, and arranging a mechanism in combination with the said parts, so that more or less of the said parts, as may be required, are forced outward to operate upon the boot or shoe at the desired point.

A is the last, its external shape similar to that of an ordinary last, with the exception that in the drawing the heel part is not represented. This portion of the last is constructed in four parts: *a* is the rear portion; *b*, the instep; and *c c*, the ball, divided longitudinally through the center so as to be spread to the right or left. The two parts *c c* are represented as connected by a link, *d*, near the toe, as seen in Figs. 1 and 2, and these parts are connected to the rear part by rods or hinges *e e*, so as to allow the last to be spread to the right and left. The instep portion *b* is connected to the rear portion by rods or pins *f*. Within the part *c c* a chamber is formed, and in this recess a toggle-joint is arranged, consisting of levers *j j*, which are connected to a screw, *l*, extending to the rear, and so as to be operated by a wrench after the stretcher has been inserted into the boot or shoe. I also arrange, in connection with the instep-piece *h*, a similar toggle, as seen in Fig. 1, with a similar screw. By turning the first of these screws the two parts *c c* are spread, as denoted in broken lines, Fig. 2, and turning the other screw the instep is raised, as denoted in broken lines, Figs. 1 and 3.

If stretching is required at particular points a knob, *n*, is attached to such point, in Fig. 2 represented as at several points. Wetting the leather and forcing these projections beneath the moistened leather, and allowing it to dry thereon, the desired stretching is produced.

By this division of the last any of the points usually required to be stretched are easily reached, and without the knobs *n* the whole boot or shoe may be stretched.

We claim as the invention of the said WARREN HOLDEN—

A stretcher for boots and shoes, consisting of a last divided into several parts, *a b c e*, more or less, and provided with toggle-joint or equivalent mechanism for operating the said several parts, substantially in the manner described.

THE STILES & PARKER PRESS CO.
NORMAN C. STILES, *Treas.*

Witnesses:
HENRY V. BARTAN,
A. NEWTON.